(12) United States Patent
Blades et al.

(10) Patent No.: US 8,087,832 B2
(45) Date of Patent: Jan. 3, 2012

(54) BEARING FAILURE INDICATOR

(75) Inventors: Paul Blades, Bristol (GB); Richard John Henry Burness, Bristol (GB)

(73) Assignee: Airbus Operations Limited, Bristol (GB)

( * ) Notice: Subject to any disclaimer, the term of this patent is extended or adjusted under 35 U.S.C. 154(b) by 549 days.

(21) Appl. No.: 12/294,162

(22) PCT Filed: May 3, 2007

(86) PCT No.: PCT/GB2007/001608
§ 371 (c)(1),
(2), (4) Date: Sep. 23, 2008

(87) PCT Pub. No.: WO2007/132159
PCT Pub. Date: Nov. 22, 2007

(65) Prior Publication Data
US 2009/0116777 A1    May 7, 2009

(30) Foreign Application Priority Data
May 16, 2006  (GB) .................................. 0609712.5

(51) Int. Cl.
*F16C 41/04*    (2006.01)
*F16C 19/52*    (2006.01)
(52) U.S. Cl. ........................................ 384/624; 384/448
(58) Field of Classification Search .................. 384/448, 384/519, 537, 540, 569, 583, 624
See application file for complete search history.

(56) References Cited

U.S. PATENT DOCUMENTS

| | | | | |
|---|---|---|---|---|
| 2,919,942 A | | 10/1955 | Bechtel | |
| 2,970,018 A | * | 1/1961 | Ruttgers | 384/540 |
| 3,897,116 A | * | 7/1975 | Carpenter | 384/297 |
| 4,026,399 A | * | 5/1977 | Ladin | 192/98 |
| 4,063,786 A | * | 12/1977 | Rall | 384/624 |
| 5,560,687 A | * | 10/1996 | Hagelthorn | 384/562 |
| 5,810,485 A | * | 9/1998 | Dublin et al. | 384/626 |
| 7,001,293 B2 | * | 2/2006 | Lubben | 384/519 |
| 7,008,114 B2 | * | 3/2006 | Derscheid et al. | 384/624 |
| 7,393,141 B2 | * | 7/2008 | Fahrni et al. | 384/583 |
| 2005/0036724 A1 | * | 2/2005 | Derscheid et al. | 384/624 |
| 2007/0215032 A1 | * | 9/2007 | Melberg et al. | 116/218 |
| 2007/0269157 A1 | * | 11/2007 | Fahrni et al. | 384/569 |

FOREIGN PATENT DOCUMENTS

| | | |
|---|---|---|
| EP | 1681479 A1 | 7/2006 |
| JP | 10252749 A | 9/1998 |
| JP | 2003130049 A | 5/2003 |

OTHER PUBLICATIONS

International Search Report and Written Opinion for PCT/GB2007/001608 mailed Sep. 5, 2007.
UK Search Report for GB0609712.5 dated Aug. 21, 2006.

* cited by examiner

*Primary Examiner* — Marcus Charles
(74) *Attorney, Agent, or Firm* — Lowe, Hauptman, Ham & Berner, LLP

(57) ABSTRACT

A bearing failure indication arrangement which has a bearing with an inner and outer races, a first part arranged to be attached in fixed relation to either the bearing inner race or bearing outer race, a failure indicator arranged in fixed relation to both the first part and either the bearing inner race or the bearing outer race, the failure indicator constructed so that if relative movement occurs between the first part and the bearing race to which it is attached, the failure indicator responds to the relative movement thereby indicating failure of the bearing.

10 Claims, 4 Drawing Sheets

BEARING FAILURE INDICATOR

RELATED APPLICATIONS

The present application is based on International Application Number PCT/GB2007/001608 filed May 3, 2007, and claims priority from British Application Number 0609712.5 filed May 16, 2006, the disclosures of which are hereby incorporated by reference herein in their entirety.

TECHNICAL FIELD

The present invention relates to apparatus for indicating bearing failure or degraded bearing performance. More particularly, although not exclusively, the invention relates to a bearing failure indication arrangement for use in aircraft control surfaces, for example, ailerons, flaps and spoilers.

BACKGROUND ART

The assessment of the condition or the performance of bearings is conventionally performed by checking the free play of the bearing, the condition of lubricants or by measuring the coefficient of friction of the bearing. However, many bearings when installed in their operating environment prevent or inhibit effective assessment of these performance indicators.

For example, it can be difficult to determine the coefficient of friction of a bearing if it is installed as part of a mechanism where the individual contribution of that bearing to a complex system is not easily discernable.

Furthermore, it may not be easy to assess the condition of the lubricant as the bearing may be installed in an inaccessible environment. Free play may be also very difficult to detect in the context of an assembled mechanism or may be masked completely by a seized bearing rotating within its housing or about a shaft.

These issues are particularly acute in the context of aircraft structures. Aircraft are subject to significantly more stringent reliability and performance constraints than most other complex pieces of machinery. Therefore, reliable and accurate mechanisms for monitoring the performance of bearings are essential.

A number of the bearings involved in the operation of aircraft control surfaces are frequently rendered inaccessible by other aircraft components and may also be part of more complex structures that obscure the behaviour of any individual bearing. For example, a hinge in a complex high-lift device may be part of a structure incorporating a number of bearings and the indicators of either bearing failure or incipient bearing failure may be masked by the overall operation of the device. Further, the behaviour of failing bearings can also be dependant on the physical conditions under which they are operating. Thus, a defective bearing may behave differently when the aircraft is in its operating environment and the bearings are loaded.

It is usually therefore necessary to partially or completely disassemble the assembly containing the bearing in order to determine its condition.

The present invention seeks to overcome or ameliorate the abovementioned problems.

DISCLOSURE OF THE INVENTION

In one aspect the invention provides for a bearing failure indication arrangement comprising:
(a) a bearing having an inner and outer race;
(b) a first part arranged to be attached in fixed relation to either the bearing inner race or bearing outer race;
(c) a failure indicator arranged in fixed relation to the first part and either the bearing inner race or the bearing outer race, the failure indicator adapted so that if relative movement occurs between the first part and the bearing race to which it is attached, the failure indicator responds to the relative movement thereby indicating failure of the bearing, wherein the failure indicator incorporates a pointer which is adapted to move, in relation to the bearing race to which it is in fixed relation, when the bearing failure indicator deforms or moves.

This structure allows for the in situ inspection of a bearing in order to detect bearing wear or failure. If the coefficient of friction between the bearing parts, i.e.; the inner and outer races, increases or the bearing seizes, the failure indicator provides a means of sensing such a failure or incipient failure without requiring the disassembly of the structure surrounding the bearing.

In a preferred embodiment, the failure indicator responds to the relative movement of the first part and either the inner or outer bearing race to which it is attached by moving in relation to the first part and/or the bearing race to which the first part is attached. This movement may be manifested by the failure indicator moving in relation to a reference mark by means of the pointer, or by deforming.

Preferably, the failure indicator is in the form of an annular ring and is adapted to engage with the bearing inner race or the bearing outer race.

The failure indicator preferably engages with the bearing inner race or the bearing outer race by means of a detent.

The failure indicator may be fabricated from a material which has physical properties chosen so that the failure indicator responds to a specific torque being transmitted between the bearing inner and outer race.

The invention also may provide for a hinge incorporating at least one bearing failure indication arrangement as hereinbefore defined.

The invention may also provide for an aircraft control surface incorporating a hinge as hereinbefore defined.

BRIEF DESCRIPTION OF THE DRAWINGS

The present invention will now be described by way of example only, with reference to the drawings in which.

BEST MODE FOR CARRYING OUT THE INVENTION

In the following description, it is to be understood that references to "bearing failure" also contemplates degraded bearing performance. To this end, the present invention may be used to detect not only complete failure of a bearing, but also partial failure or degraded performance of a bearing. This condition is usually manifested by a gradual increase in the coefficient of friction between the bearing's operative parts and thus an increase in the applied torque between the inner and outer races of a bearing.

Figure 1:
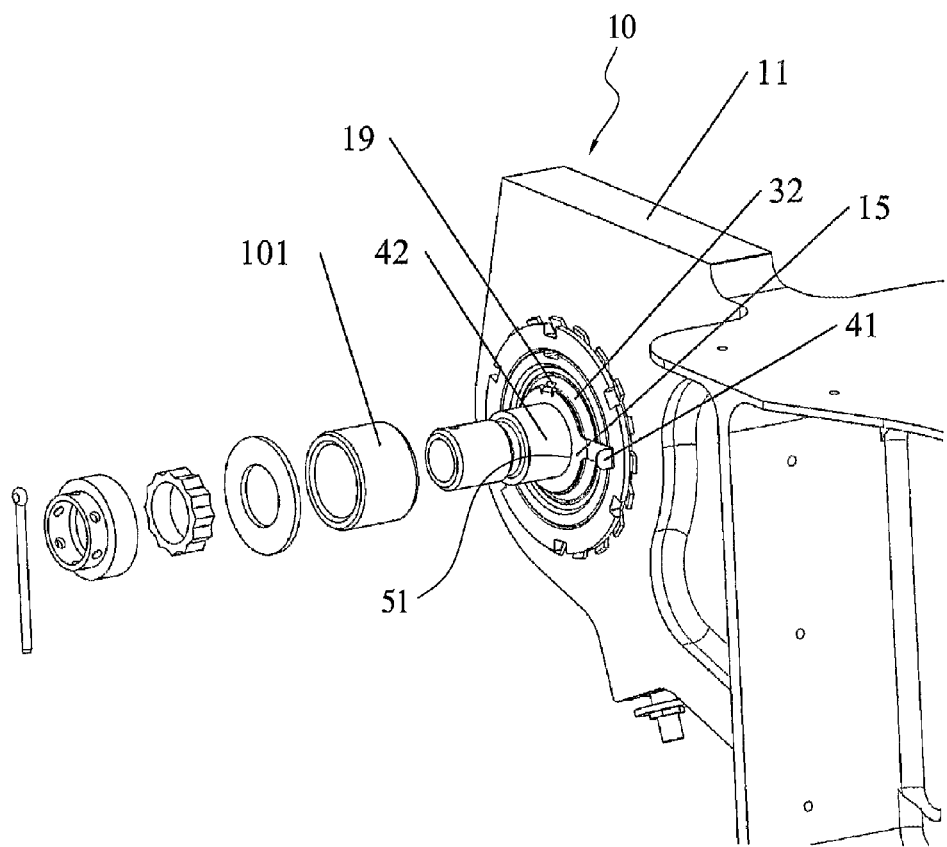
FIG. 1: illustrates a partially exploded view of a bearing failure indication arrangement according to one embodiment of the invention.
Figure 2:
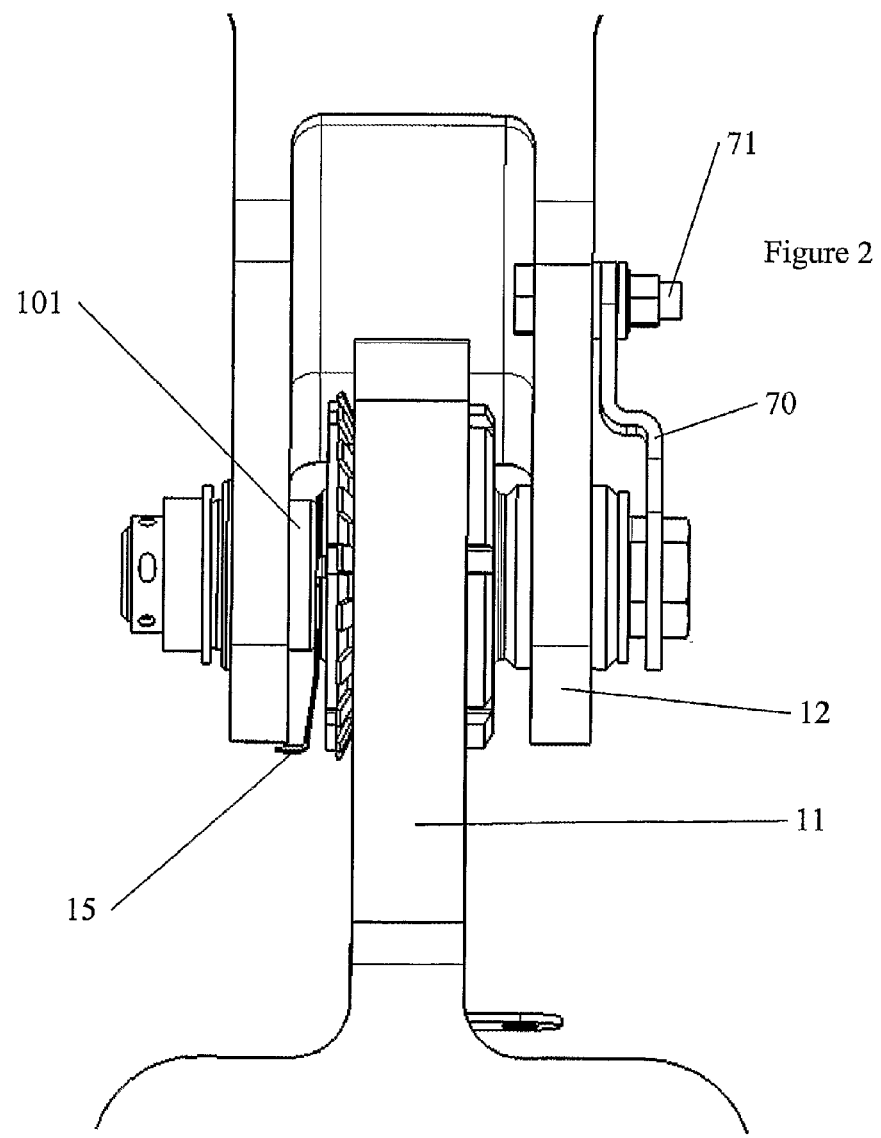
FIG. 2: illustrates a plan view of the bearing failure indication arrangement shown in FIG. 1.
Figure 3:
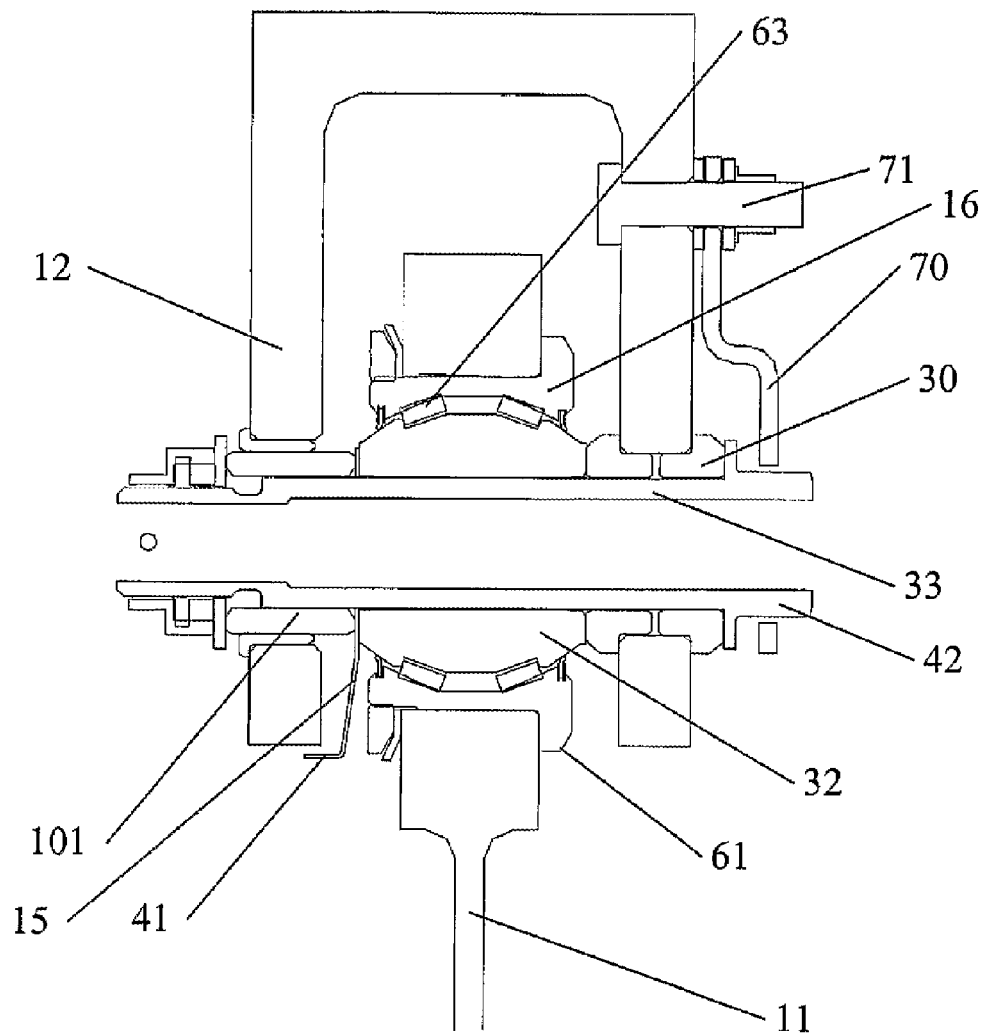
FIG. 3: illustrates a cross-sectional view of the bearing failure indication arrangement shown in FIGS. 1 and 2.

FIGS. 1, 2 and 3 illustrate a bearing failure indication arrangement 10 according to one embodiment of the invention including a bearing 61 that has an inner race 32 and an outer race 16. According to the example shown, a first part in the form of a hinge pin 42 is attached in fixed relation to the bearing inner race 32. This is conventionally by means of a friction fit with the inner race 32. The pin 42 is clamped to the fixed structure 12 by means of bushes 101 and 30 and is prevented from rotating with respect to the fixed structural part 12 by means of the anti-rotation device 70 and 71. Thus the pin 42 cannot rotate with respect to the bushes 101.

With reference to the embodiment shown in FIG. 3, the hinge pin 42, inner race 32 and structural part 12 are all fixed in normal operation of the bearing. It is noted that in alternative embodiments, the outer race could be attached in fixed relation to a part of the structure and relative movement between that part and the outer race would indicate failure of the bearing. This alternate variant will be discussed in more detail below.

Figure 4:
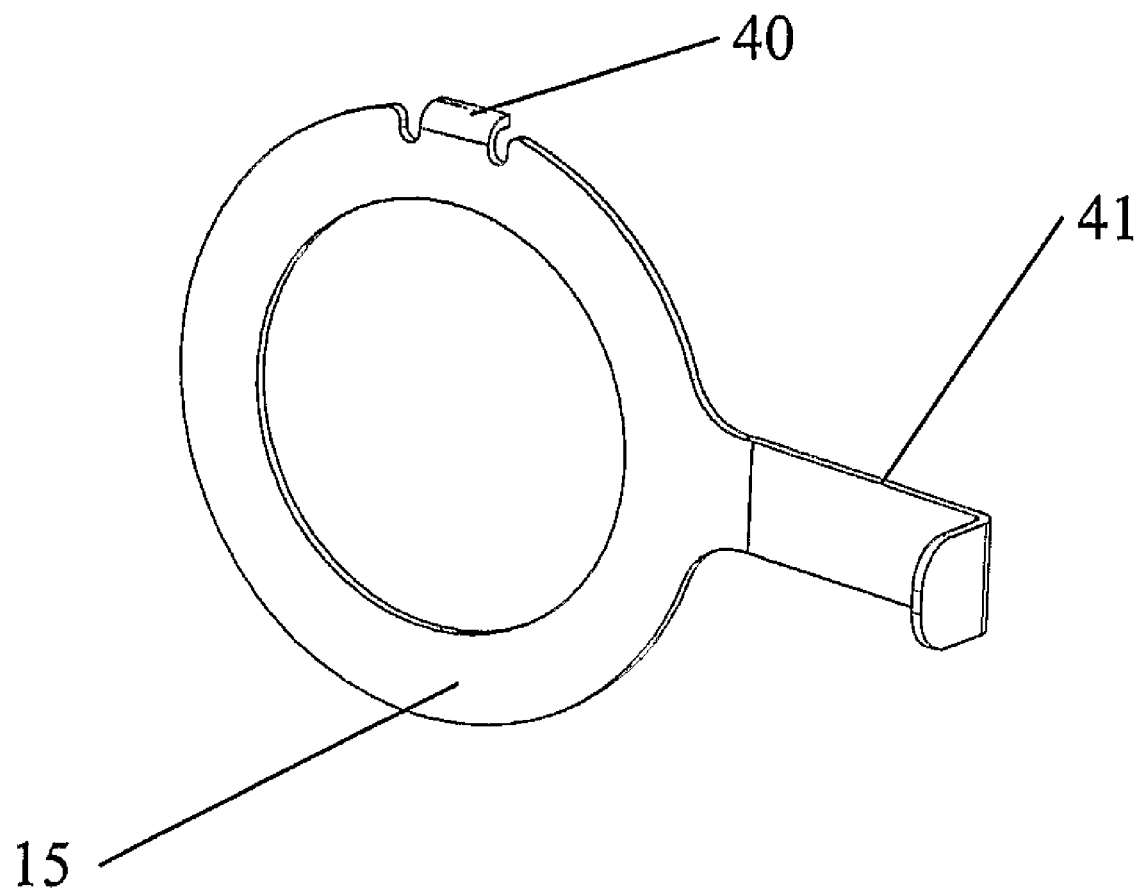
FIG. 4: illustrates detail of the failure indicator shown in FIG. 3

The bearing failure indication arrangement includes a failure indicator in the form of a Bearing Failure Indication Plate 15 shown in detail in FIG. 4. This part is conveniently referred to as the BFIP 15. Referring to FIG. 1, the BFIP 15 is arranged or mounted in fixed relation to both the hinge pin 42 and the bearing inner race 32. The BFIP 15 is located on pin 42 and attached to the inner race 32 so that if any relative movement occurs between the normally relatively fixed hinge pin 42 and inner bearing race 32, the BFIP 15 will indicate this movement, preferably in a visible way.

Relative movement between a bearing race and the part to which it is normally immovably attached can only occur if a certain torque load is exceeded between the parts.

That is, and with reference to FIG. 3, in normal operation, the inner 32 and outer 16 races rotate freely with respect to one another as per the normal function of a bearing. However, if the bearing 61 seizes or starts binding, movement of the moveable part 11 will produce a force that is reacted via the outer race 16 to the inner race 32. The inner race 32 and hinge pin 42 are clamped by the bushes 101 and the pin 42 is prevented from rotating by the mechanism 70 and 71. Depending on the preload applied to bush 101 by the clamping load introduced by the pin tightening torque, there will be a point where the force reacted by bush 101 will exceed the clamping load. In this situation, the rotational movement that would normally be applied to the freely moving bearing interface will be manifested as a torque between the hinge pin 42 and the inner race 32. As this torque load is exceeded, movement occurs between the pin 42 and the inner race 32. The BFIP 15, which is mounted in fixed relation to the inner race 32, responds to this torque thus indicating failure or incipient failure of the bearing.

In the embodiment illustrated, the BFIP 15 is mounted on the hinge pin 42 and is held in fixed position by means of a detent or tang 40 (see FIG. 4). When the BFIP is mounted in position on the pin 42, the tang 40 engages with a correspondingly shaped recess 19 visible in FIG. 1 formed in the outer surface of the inner race 32. This holds the BFIP 15 in a fixed position in relation to the inner race 32 and, under normal operation of the bearing, also in relation to the hinge pin 42.

According to this embodiment, if the bearing seizes completely, the inner race 32 is frozen in relation to the outer race 16. If a rotational force is subsequently applied to the movable part 11, a torque will be transmitted from the outer race 16 to the inner race 32 and may cause the inner race to slip in relation to the hinge pin 42. As the BFIP 15 is keyed to the inner race, the BFIP 15 will move in relation to the hinge pin 42. This movement can be detected by noting the movement of the BFIP arm 41 in relation to a fixed datum (not shown) on the fixed hinge structural part 12. If such a movement is seen, this indicates slippage between the inner race 32 and the hinge pin 42 and hence failure of the bearing 61.

In an alternative embodiment, the BFIP 15 may have a specific inner perimeter shape 51 that engages with a correspondingly shaped outer surface of the hinge pin 42. In this situation, slippage between the pin 42 and the inner race 32 will be manifested again as movement of the BFIP arm 41 in relation to the structural part 12 and also potentially deformation of the BFIP 15.

Depending on the specific form of the BFIP 15, on bearing failure, the BFIP 15 may both deform and move with respect to a datum mark thereby indicating bearing failure.

The tang 40 and/or the 'sleeve' engagement of the BFIP 15 on the pin 42 ensures that the BFIP is effectively engaged with the inner race 32 of the bearing 61 and pin 42 so that any rotational movement of the bearing inner race 32 relative to the hinge pin 42 is evident by the observation of corresponding movement of the indicator plate 15.

The BFIP may be fabricated from a material that has physical properties chosen so that the BFIP becomes "active" or responds to a specific excessive torque being transmitted between the bearing inner and outer race 32 and 16 and thus between the inner race 32 and the pin 42. Furthermore, a suitable material could be one that provides a low coefficient of friction between the BFIP 15 and the bush face. For example, the BFIP 15 may be fabricated from Alibronze and the bush constructed from steel. Such a combination provides the further advantage of guarding against any welding occurring between the indicator and bush.

Thus the invention provides for a way of detecting bearing failure by non-intrusive visual means. It is no longer necessary to disassemble a bearing installation to check or analyze a bearing's condition. This provides a clear advantage in the context of a bearing arrangement installed in an aircraft where such in situ analysis is very difficult.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

The invention claimed is:

1. A bearing failure indication arrangement, comprising:
a bearing having an inner race and an outer race;
a first part arranged to be attached in fixed relation to either the bearing inner race or bearing outer race;
a failure indicator arranged in fixed relation to the first part under normal operation of the bearing and arranged in fixed relation to the bearing race to which the first part is attached, the failure indicator adapted so that if relative movement occurs between the first part and the bearing race to which the first part is attached, the failure indicator responds to the relative movement thereby indicating failure of the bearing, wherein the failure indicator further includes a pointer which points outwardly from the bearing race and is adapted to respond to the relative movement by moving in relation to the first part.

2. A bearing failure indication arrangement as claimed in claim 1 wherein the failure indicator responds to the relative movement by deforming.

3. A bearing failure indication arrangement as claimed in claim 1 wherein the failure indicator is in the form of an annular ring that is adapted to engage with the bearing inner race or the bearing outer race.

4. A bearing failure indication arrangement as claimed in claim 1 wherein the failure indicator engages with the bearing inner race or the bearing outer race by means of a detent.

5. A bearing failure indication arrangement as claimed in claim 1 wherein the first part is a hinge pin that is mounted in the bearing inner race.

6. A bearing failure indication arrangement as claimed in claim 5 wherein the failure indicator is in the form of an annular ring, the inner perimeter of which is adapted to engage with an outer surface of the hinge pin.

7. A bearing failure indication arrangement as claimed in claim 5 wherein the pointer is adapted to move and/or deform if the hinge pin moves in relation to the bearing inner race.

8. A bearing failure indication arrangement as claimed in claim 1 wherein the failure indicator is fabricated from a material having properties selected so that the failure indicator responds to a specific torque being transmitted between the bearing inner and outer race.

9. A hinge pin incorporating at least one bearing failure indication arrangement claimed in claim 1.

10. An aircraft control surface incorporating a hinge pin as claimed in claim 9.

* * * * *